(12) United States Patent
Shaw et al.

(10) Patent No.: US 11,297,372 B2
(45) Date of Patent: Apr. 5, 2022

(54) CONFIGURATION OF USER INTERFACE

(71) Applicant: PIKSEL, INC., Wilmington, DE (US)

(72) Inventors: Philip Shaw, york (GB); Hans-Jurgen Maas, Mainz (DE)

(73) Assignee: Piksel, Inc., Wilmington, DE (US)

(*) Notice: Subject to any disclaimer, the term of this patent is extended or adjusted under 35 U.S.C. 154(b) by 0 days.

(21) Appl. No.: 15/510,961

(22) PCT Filed: Sep. 11, 2015

(86) PCT No.: PCT/EP2015/070867
§ 371 (c)(1),
(2) Date: Mar. 13, 2017

(87) PCT Pub. No.: WO2016/038201
PCT Pub. Date: Mar. 17, 2016

(65) Prior Publication Data
US 2017/0244998 A1    Aug. 24, 2017

(30) Foreign Application Priority Data

Sep. 11, 2014  (GB) ...................... 1416052

(51) Int. Cl.
*H04N 21/442*  (2011.01)
*H04N 21/422*  (2011.01)
*H04N 21/436*  (2011.01)
*H04N 21/482*  (2011.01)
*H04N 21/475*  (2011.01)

(52) U.S. Cl.
CPC . *H04N 21/42209* (2013.01); *H04N 21/42224* (2013.01); *H04N 21/43615* (2013.01); *H04N 21/4758* (2013.01); *H04N 21/482* (2013.01); *H04N 21/4826* (2013.01)

(58) Field of Classification Search
CPC ....... H04N 21/42209; H04N 21/42224; H04N 21/4826
USPC .................................... 725/24, 58
See application file for complete search history.

(56) References Cited

U.S. PATENT DOCUMENTS

| 8,963,847 | B2 * | 2/2015 | Hunt | H04N 21/41265 |
| | | | | 345/173 |
| 2009/0228922 | A1 * | 9/2009 | Haj-khalil | G06F 3/0481 |
| | | | | 725/38 |
| 2010/0052843 | A1 * | 3/2010 | Cannistraro | G08C 17/00 |
| | | | | 340/3.32 |
| 2010/0185498 | A1 * | 7/2010 | Bechtel | G06Q 10/10 |
| | | | | 705/7.33 |

(Continued)

FOREIGN PATENT DOCUMENTS

| EP | 2 728 327 A1 | 5/2014 |
| JP | H06303672 A | 10/1995 |

OTHER PUBLICATIONS http://en.wikipedia.org/wiki/Chromecast—accessed on Mar. 11, 2016.

(Continued)

*Primary Examiner* — Nicholas T Corbo
(74) *Attorney, Agent, or Firm* — Holzer Patel Drennan

(57) ABSTRACT

There is disclosed a system comprising a first device and a second device, each being associated with a user, in which a user interface of the first device is configured in dependence on content associated with the second device.

20 Claims, 10 Drawing Sheets

(56) References Cited

U.S. PATENT DOCUMENTS

| | | | |
|---|---|---|---|
| 2011/0016492 A1* | 1/2011 | Morita | H04N 5/44543 |
| | | | 725/58 |
| 2012/0030587 A1* | 2/2012 | Ketkar | H04N 21/4516 |
| | | | 715/751 |
| 2012/0200571 A1 | 8/2012 | Newell | |
| 2013/0173765 A1* | 7/2013 | Korbecki | H04N 21/42209 |
| | | | 709/221 |
| 2014/0032635 A1 | 1/2014 | Pimmel et al. | |
| 2014/0108614 A1 | 4/2014 | Gunderson et al. | |
| 2015/0296250 A1* | 10/2015 | Casper | H04N 21/4316 |
| | | | 725/34 |
| 2016/0037332 A1* | 2/2016 | Egeler | H04N 21/436 |
| | | | 455/420 |
| 2016/0191995 A1* | 6/2016 | el Kaliouby | A61B 5/165 |
| | | | 725/12 |

OTHER PUBLICATIONS https://en.wikipedia.org/wikiWii_U—accessed on Mar. 11, 2016.
UK IPO Search Report, dated Mar. 14, 2016.
International Search and Written Opinion, dated Nov. 17, 2015, EPO.
Examination Report from European Patent Office for corresponding EP application No. 15767117.3, dated Jan. 10, 2020.
Summons to attend oral proceedings from European Patent Office for corresponding EP application No. 15767117.3, dated Dec. 7, 2020.

\* cited by examiner

CONFIGURATION OF USER INTERFACE

BACKGROUND

Field of the Invention

The present invention relates to configuring a user interface of a first device of a user to control content associated with a second device of a user. This is particularly but not exclusively concerned with video content.

Description of the Related Art

It is generally known in the art for a user to watch video content on the display of a device. A typical video content may be live television on a so-called linear channel or video-on-demand. It is also generally known in the art for a user to utilise a user interface of a touch screen device to control the delivery of video content.

Wearable technology covers a broad range of personal device from health tracking gadgets to watches and glasses. Devices in this class come in a variety of form factors each tailored to a particular use case: glasses, a watch, a clip on pedometer, blood pressure and heart rate straps, and clothing fabrics that include sensing functions.

It is an aim of the invention to utilise two devices of a user to control the delivery of content associated with one of the devices, and in particular to utilise a device which can be considered as wearable technology for the control of the delivery of content.

SUMMARY OF THE INVENTION

There is provided a system in which a user interface of a first device is configured in dependence on content associated with a second device. Each of the first and second devices may be associated with the same user.

The second device may display the content.

The user interface of the first device may be configured to obtain ratings information, indicating the user's ratings of the displayed content.

The user interface of the first device may be configured to provide a remote control to control the display content. The remote control may control playback of video.

The user interface of the first device may be configured in dependence on the state of the displayed content. The user interface may display now/next content information in dependence on the state.

The user interface of the first device may be configured in dependence on sensed information. The sensed information may be day, time of day, position, ambient temperature.

The user interface may be configured in dependence on the relative positions of the first device and the second device. The user interface may be configured in dependence on the relative locations of the first and second devices. In such case the user interface may be configured based on the specific location of the first device. The user interface may be configured dependent on the relative orientation of the first and second devices.

When the content is displayed by the second device, the control provided by the user interface of the first device may be provided in conjunction with the user interface of a third device. For example information may be displayed on one device, and inputs may be provided at another device, to enable control of the content displayed.

The second device may be associated with content but not display the content.

The user interface of the first device may additionally be configured in dependence on a user interface of a third device. For example, where the first device is interactive glasses, the interactive glasses may be additionally configured by a user interface of a car when a user wearing the glasses is driving. In such case, the user interface of the glasses may be disabled from displaying information associated with the content, but a user interface of the car may instead orally display the information which would otherwise have been displayed visually on the glasses.

The first device is advantageously a watch-type device. The first device may be interactive glasses. Where the first device is interactive glasses, the device may additionally interact with a watch-type device.

The first and second devices may be complimentary devices, a direct communication being provided between the first and second devices.

A server may control the first and/or the second device.

The system of claim 1 in which the user interface is further configured by customising it in dependence on user preferences.

There is also provided a method of controlling a system comprising a first device and a second device, each device being associated with a user, the method comprising configuring a user interface of the first device in dependence on content associated with the second device.

The method may control the second device to display the content.

The method may configure the user interface of the first device to obtain ratings information, indicating the user's ratings of the displayed content.

The method may configure the user interface of the first device to provide a remote control to control the display content. The remote control may control playback of video.

The method may configure the user interface in dependence on the state of the displayed content. The user interface may display now/next content information in dependence on the state.

The method may configure the user interface of the first device in dependence on sensed information. The sensed information may be day, time of day, position, ambient temperature.

The method may configure the user interface in dependence on the relative positions of the first device and the second device. The method may configure the user interface in dependence on the relative locations of the first and second devices. In such case the method may configure the user interface based on the specific location of the first device. The method may configure the user interface dependent on the relative orientation of the first and second devices.

When the content is displayed by the second device, the method may provide the control provided by the user interface of the first device in conjunction with the user interface of a third device. For example the method may display information on one device, and the method may facilitate inputs to be provided at another device, to enable control of the content displayed.

The method may associate the second device with content, but the content may not be displayed.

The method may additionally configure the user interface of the first device in dependence on a user interface of a third device. For example, where the first device is interactive glasses, the method may additionally configure the interactive glasses in dependence on a user interface of a car when a user wearing the glasses is driving. In such case, the method may disable the user interface of the glasses from displaying information associated with the content, but the method may enable the user interface of the car to instead orally display the information which would otherwise have been displayed visually on the glasses.

The method may comprise configuring the user interface in dependence on user preferences.

The method may be controlled by a server connected to the first device or the second device or the first and second device.

The method may be implemented by software embedded on the first device, the second device, or both the first and second device. The method may be implemented by software embedded on a server connected to either the first device or the second device or to bot devices.

The content is preferably video content. The content is preferably video content associated with a video-on-demand service or a video streaming service.

A system may comprise a device associated with a user, the device having embedded software, wherein the user interface is configured in dependence on the state of the software and the state of a user.

The state of the software may utilise information on the state of content associated with the device. The content may be video content, and the state of the software comprises the state of a video playback where the device is being used to playback content, for example.

The user interface associated with the state of the software may be configured in dependence on the device. For example the configuration of the user interface in dependence on the state of the software may additionally be dependent on the type of the device. The user interface linked to the state of the software may be different dependent on whether the device is, for example, a tablet or a television.

The state of the user may comprise information on the context of the user. For example the location of the user defines a user context.

The state of a user may be the state of a user associated with the device, or the state of another user. For example the configuration of a user interface for a user may depend on whether other users are present, for example moving confidential information from a display on a user interface of a television to a display on a user interface of a phone. Conversely information on the display of a phone may be displayed on the television when it is determined that multiple users are presents.

The system may be a system associated with a video-on-demand or video streaming service. The system may be controlled by a server connected to one or more devices. One or more devices may be connected directly or via a network.

BRIEF DESCRIPTION OF THE DRAWINGS

The invention is now described by way of example with reference to the accompanying drawings, in which.

DESCRIPTION OF PREFERRED EMBODIMENTS

The invention is described by way reference to examples, but is not limited to features of these examples which are referred to for assisting in describing the invention.

The size of most wearable devices means that they are unable to contain the full complement of communication technology to support communication methods that are provided by a phone or a tablet. Moreover, it may not be beneficial for wearable devices to operate independently of other devices. For this reason, wearable devices typically function as accessories to other devices rather than as standalone devices in their own right. Communication between wearable accessories and associated phone/tablet devices may be by direct radio connection such as via Bluetooth, or by network connection such as by WiFi. Bluetooth is the most typical form of communication because of its low power consumption profile.

A smart watch, for example, acts as an alternate display and interaction console for an associated second device. These devices together can be used by the consumer to navigate the ecosystem of content around them, reinforcing the accessory role a watch fulfils. Where the phone or tablet may be used to perform fine detailed actions, the watch may be best placed to allow the user to engage quickly.

The limited screen real estate of a watch-type device and the small amount of bandwidth available to it makes direct consumption of content impractical. The use of a watch-type device in consumption of content is therefore preferably in addition to a device on which the content is displayed. The watch-type device can be used to provide convenience and to personalise access to content.

A watch-type device is likely to be one of the most personal devices a user owns in the ecosystem of consumer devices. Whilst devices such as a tablet or phone are likely to be personally owned, they may be shared by others, and they may also be left in locations distinct from the users location. Interactive glasses are more likely to be kept with a user because they are worn, but as with a phone it is possible that they are left separate to the user or that the user is not always interacting with them or is even not allowed to interact with them. A watch-type device occupies a unique position in the ecosystem because it does not interfere with the user doing other tasks, and is more likely to always be attached to the user.

There is disclosed herein arrangements which advantageously utilise the role of a smart watch within a video and related media ecosystem. However the arrangements disclosed herein apply to devices other than a watch-type device, and are not limited in their applicability to use with a watch-type device, although they find particularly advantageous applicability when applied to a watch-type device.

Figure 1:
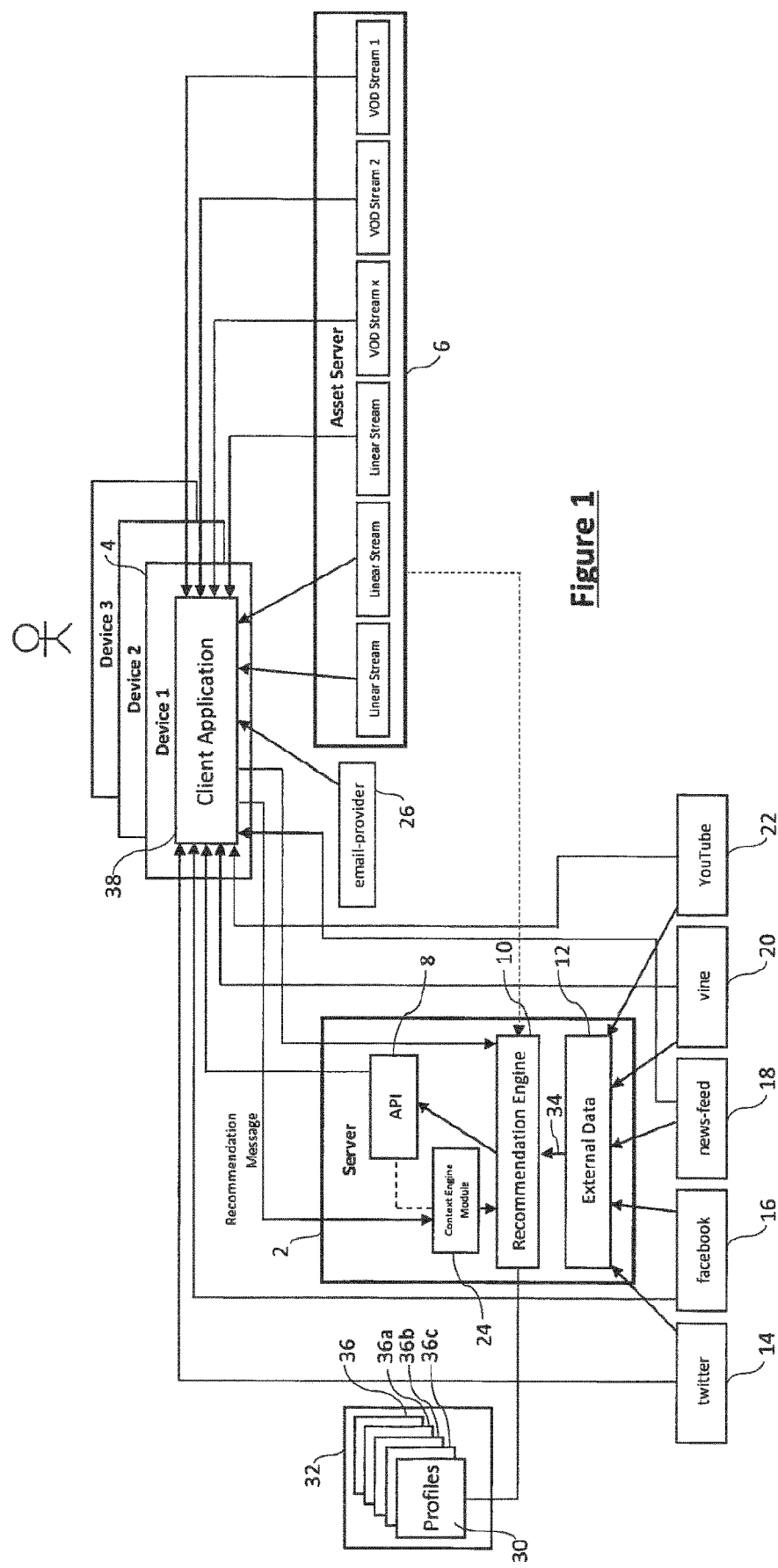
FIG. 1 is a schematic diagram of an overall architecture of a content delivery system.

FIG. 1 is an exemplary schematic architecture of a high level design of a content delivery system. A control server 2 is connected to a user terminal 4 by any suitable communication network, whether wired or wireless. The network is not shown in FIG. 1 for reasons of clarity. The user terminal 4 is also in communication with an asset server 6 via a same or different network. The asset server supplies video assets which can be linear stream assets or voice-on-demand (VOD) assets. The user terminal 4 requests assets from the asset server 6 based on information which it receives from the control server 2. The control server 2 comprises an application programmable interface (API), for example a REST API, 8, a recommendation engine 10, an external data aggregator 12 and a context engine module 24. The recommendation engine 10, external data aggregator 12, and context engine module 24 are all implemented by a suitably programmed processor or processors (not shown). The external data aggregator 12 is connected to a number of sources external to the control server 2, again by any suitable communication network. In this example, these sources comprise a Twitter feed 14, a Facebook feed 16, a news-feed 18, a Vine feed 20 and a YouTube feed 22. These are exemplary only and it will readily be appreciated that other sources may be appropriate. The external data aggregator 12 receives information from these multiple sources and monitors their content so as to be able to supply content based information 34 to the recommendation engine 10. In one mode, or context setting (described later) the recommendation engine 10 operates based on the content-based information supplied by the external data aggregator 12 to recommend video assets which can be accessed at the asset server 6. Thus the recommendation engine 10 has information about all assets available in the asset server 6 and operates to recommend assets based on the content-based information 34 it receives from the external data aggregator 12. In another mode, or context setting, the recommendation engine operates based on user profile or behaviour history, without referencing the content from the multiple sources.

The user terminal 4 is labelled "Device 1". A user 34 may own multiple devices, which are indicated in FIG. 1 by the labelling Device 2, Device 3. Each of these devices is a user terminal. For example, a user 34 might own a tablet, a smartphone, a laptop, a TV set, an interactive watch or interactive glasses. The user may be using one or more devices at any particular time. In one example the user may for example, be using a smartphone (Device 1) and a TV set (Device 2), with the smartphone acting as a companion to the TV set. In any event, all the devices are capable of communicating with the server 2 when they are active and logged on by the user. However devices may not communicate directly with the server, but instead communicate directly with a paired device. For example a watch-type device may communicate directly with an associated phone. In FIG. 1, connections are shown between the user terminal 4 and the server 2. In particular, the user terminal 4 feeds data back to the context engine module 24 and the recommendation engine 10 of the server 2. In addition, the devices can communicate with the asset server to obtain assets from the asset server.

In some examples, the system is capable of delivering context recommendations based on the type of device that a user is currently logged in to.

The control server has access to user profiles 30, either in a local memory (not shown) or in a storage facility 32 accessible to the server. The user 35 has a profile 36 in the user profile 30. In this user profile are stored preferences and other information about the user 34 to allow recommendations to be made based on information personal to that user. In the present system, the user can set up individual sub-profiles, 36a, 36b, 36c, etc. which allow the user to have different preferences in different situations. This means that recommendations based on the user sub-profiles could vary even for the same user when that user is in different settings. It will readily be appreciated that a single user is being discussed, but in practice the system operates with a large number of different users, where all users have profiles and sub-profiles set up for them respectively. Only a single profile and its sub-profiles is shown in FIG. 1 for the sake of convenience.

In addition to or instead of providing recommendations based on device type, the system may provide recommendations based on other context parameters including location, time and available time.

The multiple content sources 14 to 22 are also accessible to the user terminal 4 itself as denoted by the various arrows. The purpose of these connections is to allow the user terminal 4 to access content from the multiple sources 14 to 22 when invited to do so on the instructions received from the control server 2. Thus, these sources operate in two ways. Firstly, they provide content to the external data aggregator 12 for driving the recommendation engine 10, and secondly they provide content items for display to a user at the user terminal, when they are recommended to the user terminal.

The context engine module 24 may influence the recommendation engine so that any recommendations are based on the context of a user. The context of a user may govern the behaviour of a user and therefore affect their likely preferences for engaging with content. The likely context based preferences for a user can be determined by monitoring historical behaviour of a user, by monitoring inputs from sensors associated with a user terminal, or can default to certain conditions based on information about the user, for example, in the user profile. A user can set or override context parameters associated with the context engine module 24 should they wish to do so. The context engine module 24 also may influence the recommendation engine to define the number and type of assets to be recommended to a user, based on context.

A user device 4 executes a client application 38 which may cooperate with the context engine 24 to deliver context based recommendations.

The content delivery system is capable of compiling video snippets based on various context parameters including: location, time (possibly short-form in the day and long-form in the evening), device (flat screen TV, laptop, mobile device), and available time (that is, the time available to a user to engage with particular content). The terms short-form and long-form define different types of assets—other types of content include news articles, linear news, social content. As mentioned above, different types of assets can be stored in the asset server 6, or are available from the multiple sources 14 to 22. In addition, other assets can be available from different sources (not shown), for example, static news articles. Herein, the term "content" refers to any type of displayed images or text to a user; a content item is a piece of content. The term "asset" is used herein to denote video assets and also other types of content items without limitation.

Thus, the content, type and number of the recommended assets varies with context.

Figure 2:
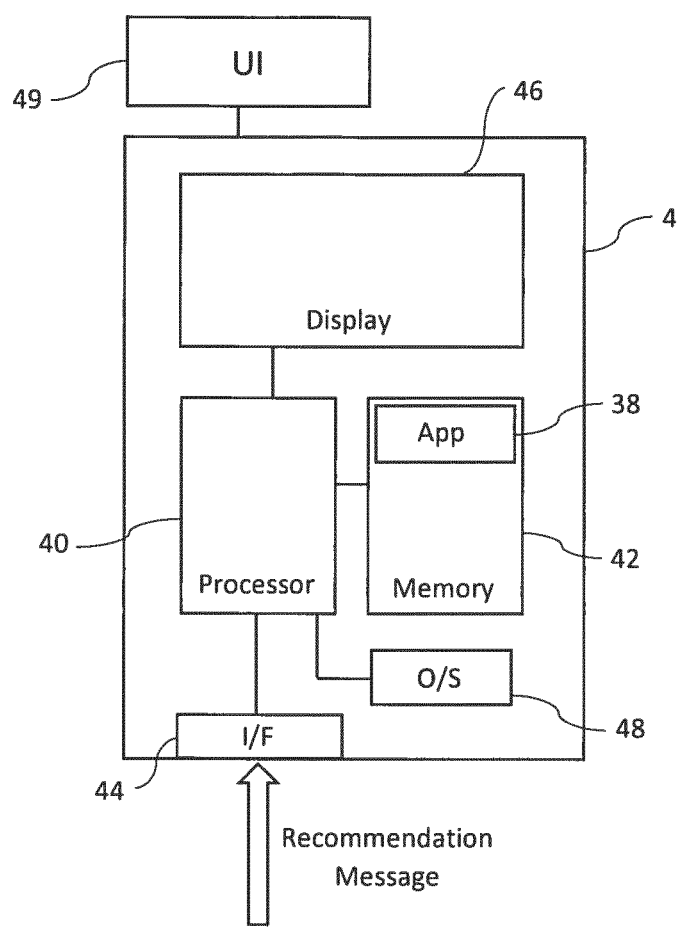
FIG. 2 is a schematic block diagram of a user device.

FIG. 2 is a schematic block diagram of an exemplary user terminal 4. The user terminal 4 comprises a processor 40 and a memory 42. A client application 38 is stored in the memory 42 and is executed by the processor 40. The user terminal 4 also has an interface 44 and a display 46. The display is controlled by the processor 40. As will be evident from the following, instructions received from the server in a recommendation message by the interface 44 are used by the processor to control the display 46. Although one processor is shown, it will be evident that the display could in fact be controlled by a dedicated graphics card or dedicated driver responsive to the instructions received from the server. The user terminal 4 has its own operating system 48. When delivering content of different types to a display 46 of a known computer device, such as a smartphone or tablet, it is the operating system which is generally responsible for aggregating different types of content and driving the display to display those different types of content. In the present system however it is the app 38 which is executed by the processor 40 and which is responsive to instructions in the recommendation message from the server which controls the display and allows the display to show different types of assets. Thus, the application can be delivered to different kinds of devices running different kinds of operating systems (for example, android, IOS, etc.). Thus, a similar experience can be delivered to users even if they are using different device types. Moreover, it is the server itself which manages the layout of the display for a particular device and the content recommendations for a particular user, so that the particular OS which is being executed by the device to support the basic operations of the device does not affect the system. Moreover, the server can deliver a recommendation message to any user terminal executing the app 38 regardless of its operating system. This allows an "eco system" to be developed wherein an operator of the server can manage the content sources and recommendations to best fit the users that it is used to engaging with, to make maximum use of the knowledge of those users, their behaviours and profiles, etc. For example, an owner of the server 2 can determine which content sources (14-22) are available and add their own specific content sources if they wish. This allows them to "shape" content delivered to a user.

Figure 3:
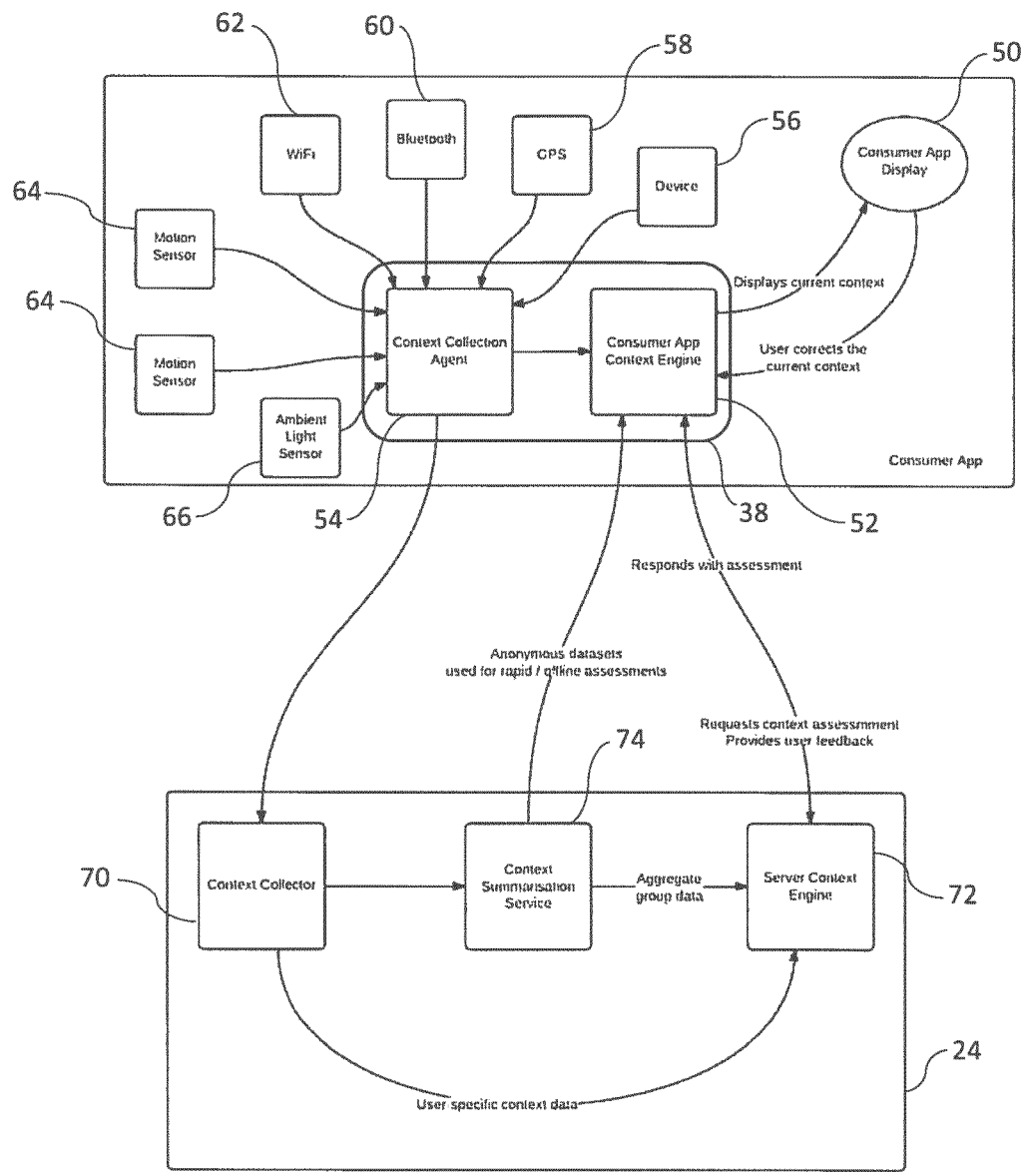
FIG. 3 is a schematic diagram illustrating the context engine at server side and client side.

Reference will now be made to FIG. 3 to describe how the context engine system works.

There are two parts of the content engine: a client side part installed on the consumer's device 4 within the ecosystem app 38, and a server side part embodied in the module 24.

The Context Engine System (CES) (which includes both parts) is designed to provide a list of contexts within which it determines a given user to exist at any particular moment.

Because the CES may not know for sure what context a user is in, it provides its assessment as a list of probabilities. Any context assessed with a sufficiently high probability is considered to be 'active' for that user. Users can be in more than one context at once: for example, they could be at home and with family; or, at work but about to go on vacation; or, at a bar with work colleagues etc.

A user always has visibility of the contexts the CES thinks they are in, as shown by the oval context display component 50 which shows context data to a user on the display 46. This presentation also gives the user the option to correct their context. The CES, for example, considers a user as at home enjoying some leisure time, but the user may actually be working from home; or on a business trip rather than a holiday. A user can engage with the display through a user interface (UI) touch screen, mouse, etc. to adapt their context.

The Context Engine logic 52, 54 is present within the consumer app 38 as well as the server so that the app is able to determine context even if there is limited access to the Internet. The whole idea of the ecosystem context is to make the app valuable to users. One way is to reduce its bandwidth footprint when on holiday using expensive cellular data.

The 'Context Collection Agent' 54 is a software service that resides within the consumer app 38, on the device 4, which collects information and intelligence from sensors available to it. Some example sensors are shown including device sensor 56, location (GPS) sensor 58, Bluetooth sensor 80, Wi-Fi sensor 62, motion sensor 64, and ambient light sensor 66.

The Context Collection Agent does not simply record the raw data arising from these sensors but performs some basic calculations from this data. The device sensor 56 provides local information about the device, e.g. the device type and its current time zone. For example, it tracks changes in time zone from the 'Device' and records this change as a significant event.

Likewise, the context collection agent summarises rates of change of motion from the motion sensor to determine whether it believes the user is walking or being conveyed in some way.

Similarly, changes in a WiFi network name, the security settings of a network, and the rate of movement amongst local Bluetooth devices are all metrics to be tracked beyond the raw data any of these sensors provide.

This is what the Context Collection Agent collects and sends to the server side component Context Collector 70 whenever a network connection exists to do so.

It also makes this information available directly to the local Consumer App Context Engine 52.

The Context Collector 70 acts as a data collection endpoint for all users' context information. It is used by the server side service Server Context Engine 72 when it performs more detailed context assessments, as well as a Context Summarisation Service 74.

The Context Summarisation Services 74 takes all the data collected about all users and summarises it into recognisable groups and patterns.

Anonymised patterns, in this way, can be used by the Server Context Engine 72 to decide if a particular user's context information is a better match for one behaviour or another when calculating its probability list for them.

For example, different users commute at different times. The Context Summarisation Service 74 will look at motion, GPS, pedometer and time of day information and summarise patterns for distinct groups of users. This information is used by the Server Context Engine 72 to fine tune its assessments.

Similarly, appropriate summary data sets will occasionally be provided to the consumer app so that it can use them to make rapid context assessments if it finds itself bandwidth constrained. Appropriate summary data sets are those which the server believes best match a user's typical behaviour which the Consumer App Context Engine 52 can use to make a best effort assessment while it waits for a better assessment from the server.

The Server Context Engine is a more functional version of the Consumer App Context Engine. It is able to perform more detailed analysis of a user's context inputs before making a determination of what it believes are the most probable contexts within which the user finds themselves. It has full access to anonymous data sets from the Context Summarisation Service 74 with which it can compare its assessments for a given user and adjust according to expected behaviours.

The Consumer App Context Engine is a pared down version of this capable of operating on a handheld device or set top box (STB). It uses information provided directly by the Context Collection Agent 54 to make assessments of what it thinks the user is doing. It balances this with information it may or may not receive from its server based counterpart.

The context display component 50 makes the current context assessments visible to the user so that they can see what has been determined and so that they can provide their feedback on this.

Feedback provided in this way is used to inform the context engines on both the consumer app and the server to allow it to adjust future assessments.

For example; suppose the system guesses a context that's wrong and the user corrects this to say 'I'm travelling to work'. The system will learn from this when the user works and when they're likely to be home and commuting.

It is important to note that the Context Engine does not decide what content is relevant within a given context. It just provides an assessment of the likely contexts which can be used as inputs to the recommendation engine 10.

Moreover it is clear that no one sensor provides a definitive answer about any context.

For example (the following is not an exhaustive list),
being at work may be determined by: time of day; previous days commutes bracketing a period of being roughly within a particular geofence; the presence of co-workers nearby; the identity of a work WiFi network being on holiday is a function of: a lack of calendar appointments; a period of offline time during a journey; a change in time zone; a change in sunrise/set times as judged by the ambient light detector; the absence of proximity to a work laptop being out with friends may be a function of time of day; presence of friends' devices; movement constrained with a given geofence for a certain amount of time; your GPS data falling within an area containing entertainment venues rather than industrial units; frequency of tagged photos on Facebook etc. . . .

being about to go on holiday may be a function of, lack of upcoming calendar items, presence of new PassBook items; a change in wake-up alarms booked.

In each case, the accumulation of evidence for a given context increases its probability, but no one piece of information decides a context definitively. The process is a best effort attempt that is fine-tuned by a comparison against anonymous data from other similar users and by user feedback and machine learning derived from this.

The recommendation engine 10 receives context information from the context engine and based on the context information makes a recommendation for assets to be displayed at the user terminal 4.

The recommendation supplies information about these assets to the API 8, which formulate a recommendation message for transmission to the user device 4. The number, content and type of asset vary depending on the context.

Described arrangements are concerned with an architecture in which a user interface of a first device is configured in dependence on content associated with a second device, the user interface of the first device being configure to control the content associated with the second device. Each of the first and second devices are preferably associated with the same user.

Thus the user interface of the first device is configured, for example using context information, and further in dependence on the content associated with the second device.

Figure 4:
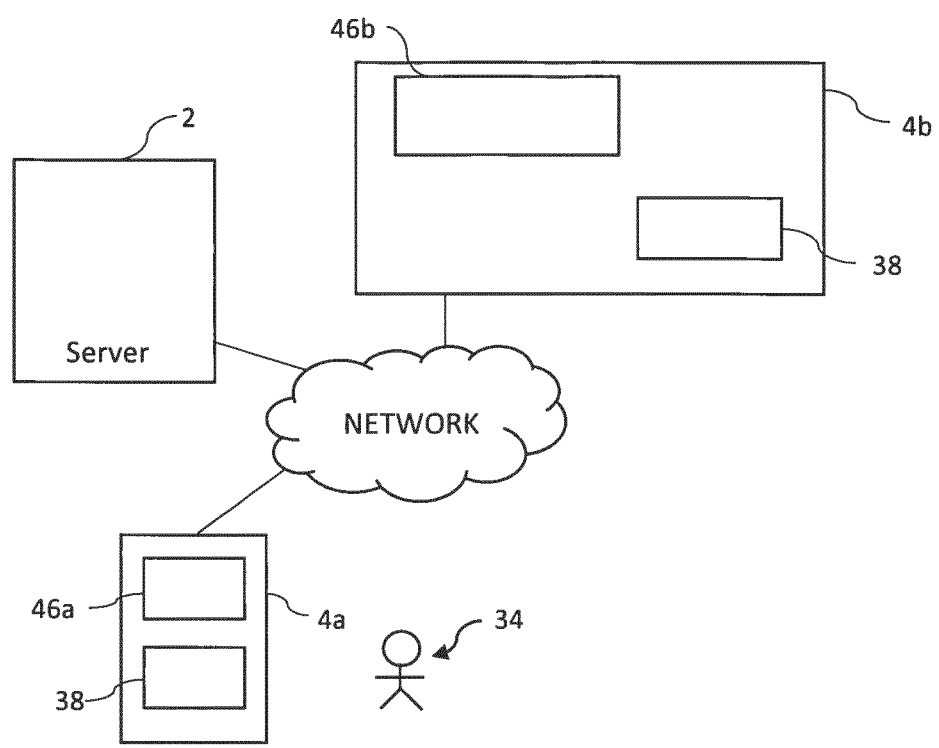
FIG. 4 is a schematic block diagram of two interacting devices.

Reference is made to FIG. 4 which shows the user interface of the user device 4a configured to control a user device 4b associated with content. FIG. 4 illustrates a first user device 4a which can for example be a tablet or smartphone, or in any event something with a relatively small display as compared with a second device 4b. The second device 4b can be for example a TV or other large screen device, for example, driven from or incorporating a set-top box. Both devices run the consumer app 38. A network is shown by which the devices can communicate. The server is also shown connected to the network. It will readily be appreciated that the network is a schematic illustration of any form of communication system allowing the devices to communicate.

The first user device 4a has a user interface 46a and the second user device has a user interface 46b.

Preferably the first device is a device which is attached to the user. For example, the first device may be a watch, and the second device may be a television. The user interface may be a watch-face with the first device being a watch-type device. Examples are therefore described with respect to the first device being a watch-type device, but the examples are not limited to this type of device. Examples are also described with respect to the first device being interactive glasses, but again the examples are not limited to this type of device. In general it is advantageous for the first device to be a device which can be attached to the user and/or which can be personalised with a high degree.

A further entity may control the first and second devices, such that the first and second devices operate, at least in part, under the control of the further entity in accordance with the arrangements described. The further entity may be the server 2 as illustrated in FIG. 4, which is in communication with both the first and second device. Alternatively one of the first and second devices may control the operation of the first and second devices in accordance with the arrangements described.

There are described examples in which the user interface 46a of the first device 4a is configured in dependence upon content associated with the second device 4b.

In a first arrangement the content associated with the second device may be displayed on a display of the second device 4b. Thus the user interface 46b may include a display. A user interface of the first device may then be used for controlling the display of the content on the display of the second device.

An example of providing a user interface of a first device tailored to content associated with a second device is tailoring or customising the user interface of a watch-type device of a user when the user is watching video content on the display of the second device.

The user interface of the first device may be configured to: provide control information for controlling the content of the display of the second device; be dependent on the state of the content on the display of the second device; or be dependent on context information.

Where the content associated with the second device is displayed on a display of the second device, options for configuring the user interface of the first device to control the content on the display of the second device include the following examples.

When viewing content on the display of the second device, the user interface of the first device may be configured to provide ratings information.

Figure 5:
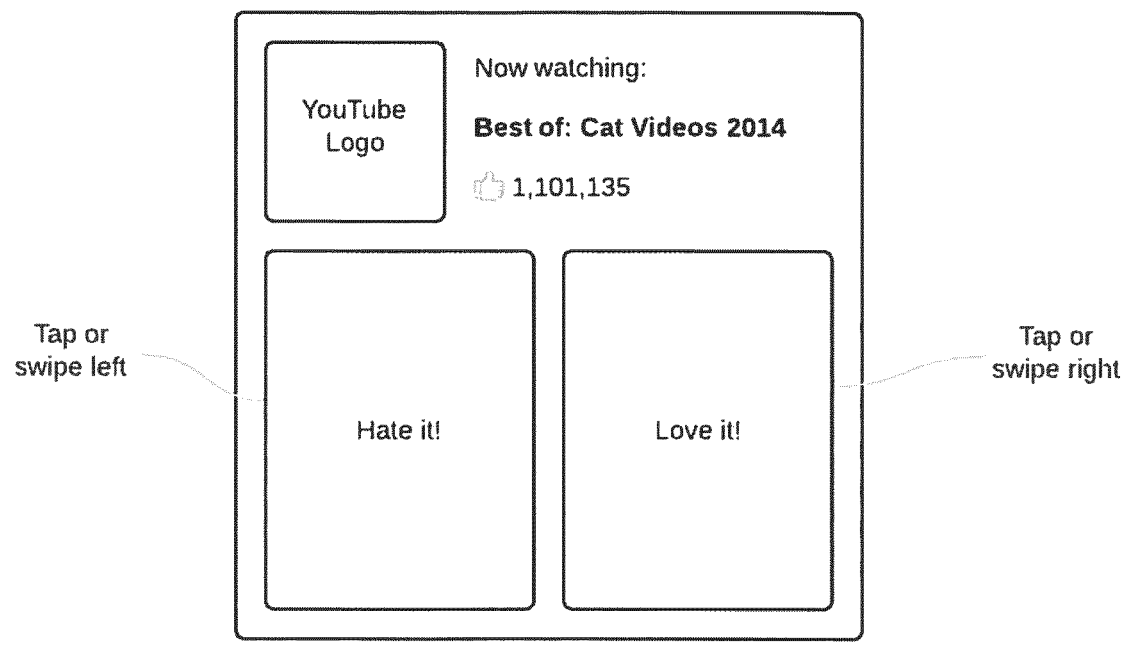
FIGS. 5 to 9 show screen shots of the user interface of a first device for different example scenarios.

The user interface may be controlled to display a simple thumbs/up down dialog, or as shown in FIG. 5 'hate it' or 'love it' options, that allows a user to provide feedback. By selecting the appropriate dialog on the user interface of the first device, a signal is sent from the first device indicating a user's rating of the displayed content.

Any alternative gesture could be detected at the user interface to provide rating information. For example the user interface may detect a gesture, rather than display any user content, which gives rating information.

The rating information provided by the user may be used to control the displayed content. For example, when viewing short form content, selection of a thumbs down on the user interface could cause the playback of content to skip to another clip with better relevance or interest. A response of either kind can be used to better inform a subsequent recommendation of content.

When viewing content on the display of the second device, the user interface of the first device may be configured to provide a remote control for the displayed content.

Double tapping the user interface of the first device may enable a touch screen of the user interface, and the touch screen can be used to allow that playback to be controlled in fine detail. The control may be by selecting displayed options on the touch screen or by detecting gestures at the touch screen without any display thereon.

For example: a double tap may pause playback; tap and hold may cause stop; swipe forward may fast forward; repeated swipe forward gestures may speed up the scan; swipe backward may rewind in a similar way; single tap may resume playing; swipe up may move to the next content; and swipe down may restart or move to the previous content.

All of these may be performed by the user without even looking at the user interface of the first device. In this way the user interface of the first device fulfils a role as an easy to use accessory to the main activity on another display without being unduly distracting.

Figure 6A:
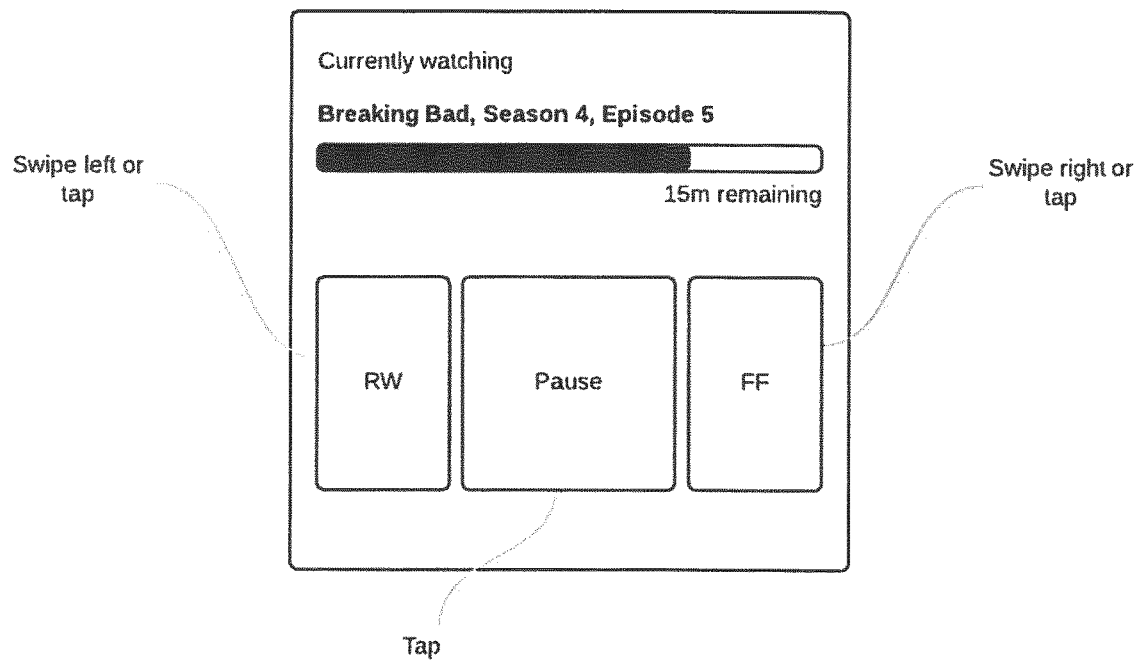
Figure 6B:
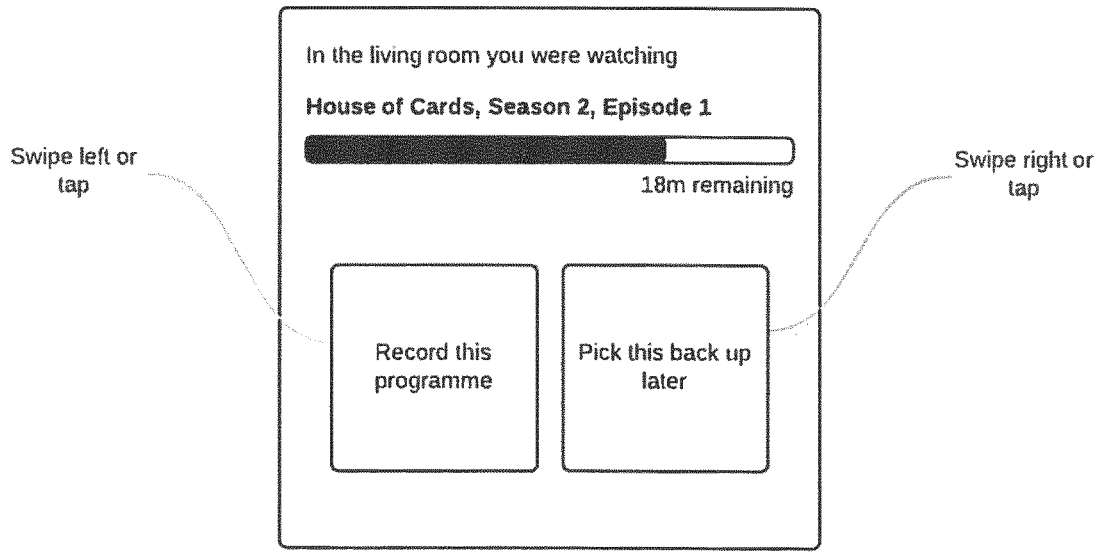

FIG. 6(a) shows an example in which options to rewind, pause of fast-forward a current watched video content are provided. FIG. 6(b) shows an example in which options to record or pick a programme back up later are provided.

When viewing content on the display of the second device, the user interface of the first device may be configured in dependence on the current state of the content. This configuration may be used to provide now/next summaries on the user interface.

Where the content displayed on the display is video content, the control information displayed on the user interface of the first device may control information for controlling the display of the video content dependent on the state of the video content displayed on the display of the second device.

When the user is watching on the display a programme that is nearly ended, tapping on the user interface of the first device may present a small summary of the current programme, and use a large portion of the screen to display details of what to watch next—a now/next summary.

Options for what to watch next may be: what's on next if the programme is being shown on a linear channel; what's starting soon on another channel if the programme is more appropriate for the user; the next episode in a season if available on demand; other related programmes if the current programme was being watched on-demand.

The user is able to swipe left/right between these options and tap to select the option they want to act upon.

The user interface of the first device may switch to this mode of operation if it is otherwise configured for rating information or as a casual remote control. The user interface may switch to a different mode of operation after the particular state has ended, such as after new content is selected.

Figure 7A:
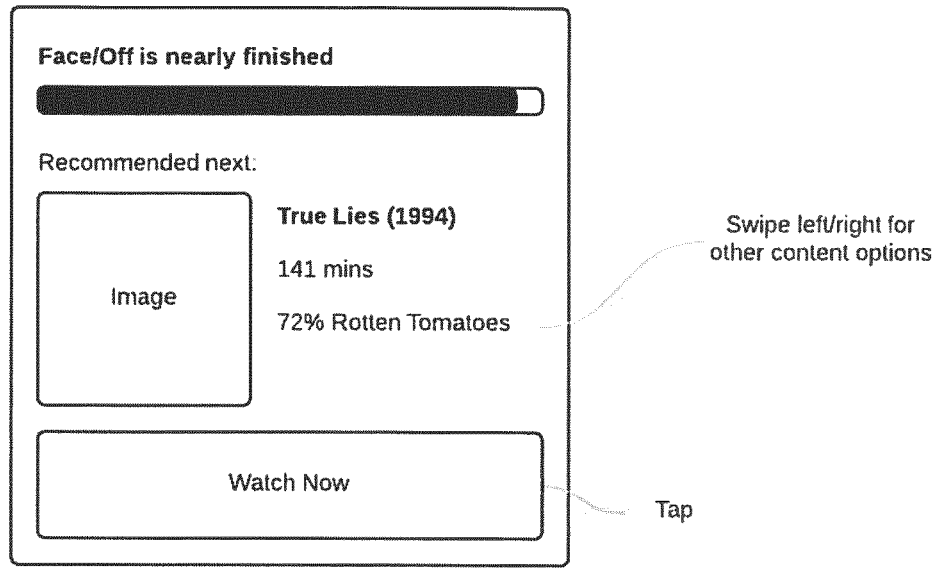
Figure 7B:
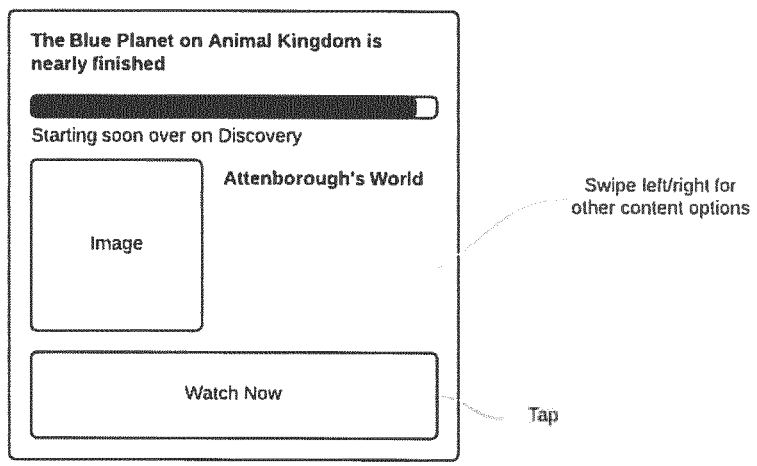
Figure 7C:
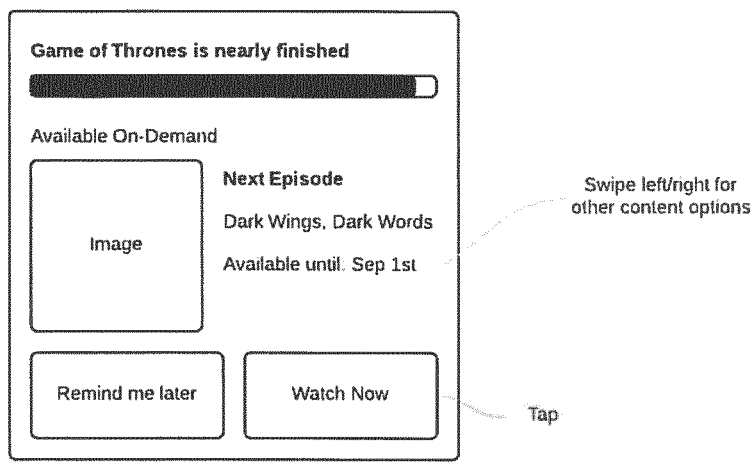

FIG. 7(a) illustrates an example in which the display of the user interface of the first device provides a recommendation for a next video content to display. FIG. 7(b) illustrates an example in which the display of the user interface provides information for a next video content based on video content about to commence on a particular channel. FIG. 7(c) illustrates an example in which the display of the user interface of the first device provides information of on-demand video content. All of these options may be influenced by recommendation and/or context.

When viewing content on the display of the second device, the user interface of the first device may be configured in dependence on sensed information. The sensed information may identify the date, the time, the position of the first device and/or the second device etc. This information may be obtained based on information provided by the sensors as shown in FIG. 3.

For example, where time of day information is sensed in combination with location information, the user interface of the first device may be configured in dependence on a detection that the user is approaching an end of their commute on public transport. Thus the use of the user interface of the first device as a casual remote control may be changed to allow the user to select to record content, for example.

When viewing content on the display of the second device, the user interface of the first device may be configured in dependence on the relative positioning of the first device and the second device.

The relative positioning may be the location of one device relative to the other. The user interface of the first device may be configured according to the proximity of the first device to the second device.

Consider an example where content displayed on the display of the second device is video content. In such an example, the user interface is configured for controlling the display of the video content. However, in this example, the displayed control information is dependent on the location of the first device relative to the display. This feature may assume that the first device is attached to the user and thus represents the location of the user.

The user interface of the first device acts as a control for the content displayed on the first display, and there is preferably employed a detection technique for detecting the proximity of the second device to the display of the first device. The relative positioning may be determined using sensors.

In the example, the first device is attached to the user, the user watching the video content on the display of the second device. In this way as the position of the first device is monitored relative to the display of the second device, the position monitoring represents an accurate reflection of current positions. As the user moves, the first device moves with the user. In this way the position of the device provides an accurate and reliable position of the user. If the device where left or put down by the user, then its position could not be used to give reliable information about the position of the user which would allow its user interface to be reliably and usefully configured in dependence thereon in accordance with the various examples given.

Where the user interface of the first device provides a control device for controlling the displayed video on the display of the first device, and it is determined that the user interface of the first device is within a proximity of the display of the second device such as to provide in-play remote control functionality of the displayed content. The control information displayed on the user interface of the first device may, in general, be any control as described herein for remote controlling the content.

Where the user interface of the second device provides a control device for controlling the displayed video on the display of the first device, and it is determined that the first device is outside of a proximity of the display of the first device—for example if the user leaves the room where content is playing on TV—the control information displayed on the user interface of the second device—for example when the user interface is tapped—may be one or more of: title; remaining duration; option to record the remainder of the show if watching a linear channel; and option to store a resume point for on-demand content so that the user can pitch up from the same place later. In this case the user interface provides out-of-play remote control functionality of the displayed control.

On a shared TV the option to halt playback may not always be the most appropriate action as others may still be watching, but the option to continue watching a programme later is enabled by this feature.

The relative positioning may be the orientation of one device relative to the other. The user interface may be configured according to the orientation of the first device to the display.

For example, the first device may be glasses having an interactive capability and equipped with a user interface. The user interface is configured in dependence on whether the user wearing the glasses is watching the displayed content or not. If the user is not watching the displayed content, or is detected as not watching the displayed content for a particular duration of time, the user interface may be configured in the example above as if the user had left the room. Otherwise the user interface may be configured as a ratings, casual remote control, or state dependent control for the displayed content, as described above.

In general in all of the examples above, which relate to a user watching displayed content and having a further device which allows remote control of the displayed content, the user may have multiple further devices which facilitate the remote control. For example, a set of interactive glasses may be used to provide a display of the user interface to the user, and a watch-type device may be used by the user to detect user inputs at the user interface. The interactive glasses and the watch-type device operate together to control the displayed content on the second device.

In the above examples it is assumed that a user associated with the first device, the first device preferably being a device attached to the user, is watching content displayed on a display of a second device, or else otherwise that the configuration of the user interface is associated with the user watching displayed content.

The configuration of the user interface may additionally be dependent on user performance to take into account the preferences of the user. Thus in any example referred to, the user interface may be additionally modified in accordance with user preferences. The performance may be taken into account by accessing stored preference information.

Thus the tailored or customised UI may be established with default settings. A default setting may be that a now/next user interface is displayed 5 minutes from the end of a current programme. However this default setting may be adapted for a user according to their preferences.

A learning algorithm may also be used that takes into account a users typical activities, e.g. that a particular user always utilises the ratings user interface when film content ends, or another user typically utilises a recommendations user interface when content ends.

In further examples below, the user associated with the first device, preferably being a device attached to the user, is not watching content displayed on the display of a second device, but is associated with content linked to the second device. For example both the first device and the second device may be owned and registered to the user, and the second device may be linked to content registered to the user. For example the second device may have stored recorded content for the user, or the second device might be aware of the user's preference for content based on stored history of previous choices, but the second device may not currently be displaying content to the user.

Thus interactions with the user interface of the first device to control content associated with the second device do not always take place when viewing content directly at a display of the second device, and the user interface of the first device may be advantageously configured in dependence on content associated with the second device other than actual displayed content.

Figure 8A:

For example, the user interface of the first device may provide information about a favourite show or of an event that is about to be missed, as illustrated in FIG. 8(a). When a user is away from home and a season of programmes they usually watch is about to air a new episode, the user interface of the first device may present an alert that offers the user a range of appropriate actions such as: record the show (if DVR is available) or add to a 'watch at home' watch list (for when the show is available on demand or catch-up).

Figure 8B:
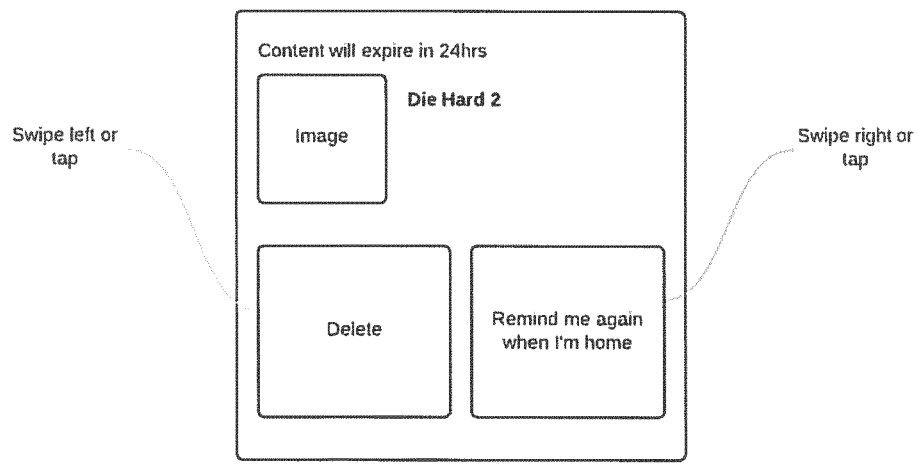

For example, the user interface may provide notifications which remind the user that content is about to expire, as illustrated by FIG. 8(b). Typically users will accumulate content that they wish to watch in some kind of watch list either because their actual level of interests is vague or the content is too long to watch right now, or they like the idea of it but are not in the mood to watch it right now. Content in such a list often gets stale as a user forgets it is there. Timely reminders of content that will expire soon ensures users keep this list fresh and active. Moreover, alerts about shows the user has expressly earmarked as interesting in this way will not feel intrusive.

Whilst examples when content is not being watched are particularly pertinent to the user being away from the location where the second device is located (such as home), they may also apply to the user being co-located with the second device by not using it for displaying content.

As in scenarios where content is displayed on the second devices, in scenarios where content is not displayed the user interface may be configured according to user preferences.

In further arrangements, the user interface of the first device may be configured in dependence on a third device.

For example, a third device may be additionally utilised to configure the user interface of the first device when the user is watching content displayed on the display of the second device.

For example, a user may be wearing interactive glasses having a user interface when watching video displayed on the display of the second device, and may additionally be equipped with a watch-type device having a user interface. The display of the user interface of the interactive glasses may display information to the user, such as remote control options, and the input of the user interface display of the watch-type device may be used to detect the users input.

For example, a third device may be additionally utilised to configure the user interface when the user is not watching content displayed.

For example, a user may be wearing interactive glasses having a user interface. The user then drives a car, such that any display or certain types of display on a display of the user interface of the interactive glasses is undesirable. The interactive glasses may interact with a third device in the car, either directly or via a network, such that the third device of the car disables the display of information such as notification of the start of a linear television programme when the user is driving. However the third device of the car may be adapted such that when such notification occurs which would normally cause a display to be displayed on the user interface of the interactive glasses, a message is instead delivered audibly, for example using audible technology provided in the car.

Where a third device is used, the user interface of the first and third devices can be configured in accordance with user preferences as described above.

A further example of the configuration of the user interface in dependence on a third entity can be considered in relation to an example of a user watching a film displayed on the display of a cinema. The user interface of a first device associated with the user can then be used to display additional information associated with the film to the user. This information may include, for example, information about the content, such as information on music associated with the displayed film. The user interface may be configured to display options to allow a user to select to bookmark the music in associated account.

Figure 9:
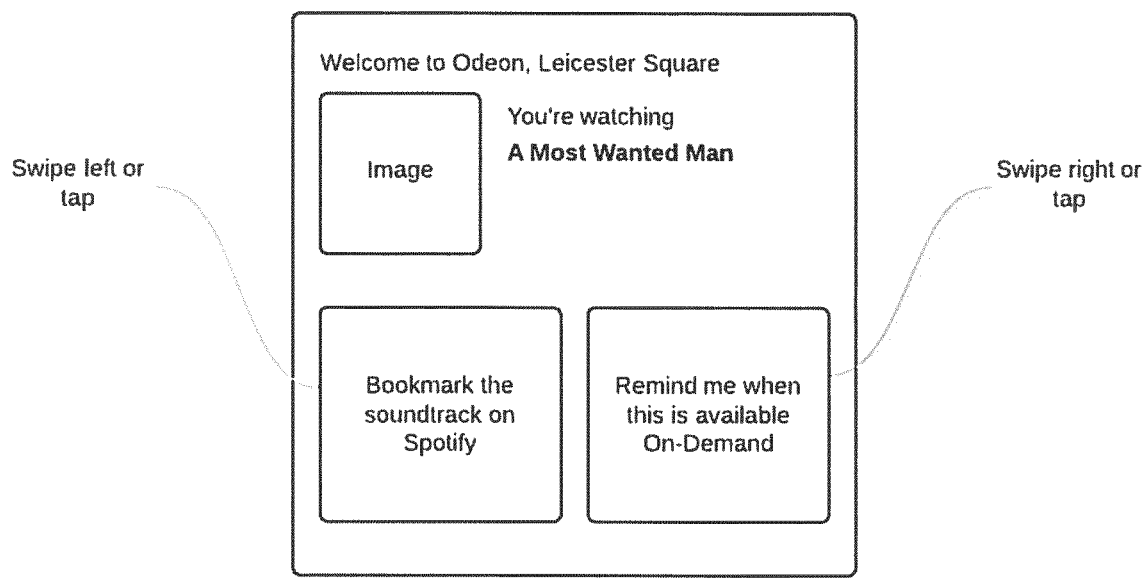

FIG. 9 illustrates an example.

In this way, the user interface of the first device provides secondary purchase opportunities. Interactions do not necessarily have to relate to content the user owns. For example, in a cinema tapping the watch might present the user with the opportunity to purchase the soundtrack album or to be reminded when the movie is available on PPV or on-demand, with the resulting interaction being associated with the second device.

In an example a device is associated with a user. Software is embedded on the device. The user interface is configured in dependence on the state of the software and the state of the user.

The purpose of any user interface configuration is to make available to the user of the device those interactions which are both possible and relevant: it is the means by which a user engages with content.

Typically, a user interface is configured to offer the user those interactions which are relevant to the state of the software at any given time. For example: a set of playback controls may be shown whenever a piece of audio/video is playing; the same control panel may show a pause button when the content is playing and a play button if it is currently paused or stopped.

Each of these is an example of how the configuration of the user-interface is determined by the state of the software. The software deals with the content and in particular the display and control of the content.

In general, a user interface is configured to provide the user those interactions which are relevant to the software. A website may show a 'Submit' button whenever all the text entry fields have been filled in correctly for example.

The user interface associated with the state of the software may also be configured in dependence on the device type. The user interface linked to the state of the software may be different dependent on whether the device is, for example, a table or a television.

In examples, rather than the configuration of the user interface being a function of the software state alone, it is additionally a function of the user's state.

The user state, or context, is a descriptor which a device can measure or infer from one or more sensors or data sources. For example; a device might detect that it's user is travelling given GPS and velocity data; or, it might detect that it's user is at home given its proximity to other known and fixed devices; or that the user's free time is constrained by appointments in a calendar.

These, and other measurements and deductions can be used to further customise the configuration of a user interface through which the user engages with content utilising the user interface.

In examples, the purpose of the user interface is to allow a user to read, watch, listen or otherwise consume content or use a service of one kind or another.

An awareness of the user's context allows the configuration to be tailored therefore not only to the software state and the users current context, but also the likely activities with which the user will wish to engage at any given moment, i.e. the user's next or future context.

Further, these activities may take place in a number of different scenarios. Content may be consumed and engaged with through a single device. Content may be displayed through one device, but interactions and feedback provided through another. Content may be displayed through one device, with interactions handled through another and feedback optionally provided through a third device. Examples are given above in which content is consumed using two or three devices working cooperatively.

The specific arrangement of devices and their roles in an activity are part of the user's context. A user may be watching television, but controlling the television though their phone. A user may be watching an on-demand asset on their phone and controlling it there too. A user may be watching TV, pausing and resuming through it utilising a smart watch but looking through recommendations for what to push to the TV next through their tablet. These are all aspects of user context.

Each of these playback scenarios offers the system a different opportunity to customise the configuration of the user-interface on each device to match the user's state, or context.

The user's context does not simply determine the genres of programmes they might want to watch next, but also the type of interaction they might want to perform on it or around it.

For example, an awareness of the user's context might prompt the software to offer up the next episode of a show if it knows that the user has time, or to set a reminder to watch the next episode if there is no time to do so now.

Depending on how the user is consuming the content, the configuration of each device's user-interface may be different. This configuration can take into account user preferences, with potentially a user having preferences which are specific to device types.

If the next-episode situation arises on a tablet when away from home, then the interaction is added to the user-interface on the playback device. A local adaptation is therefore provided, designed to offer the user relevant interactions in their current state.

In another example, a user is at home in the living room but with only the television and their smart-watch. The user-interface on the television may be adapted to show the detail of the option to watch the next episode or to set a reminder to view it later, but the watch may be used as the input mechanism.

If the user is in the same situation but they have their tablet open, the interaction may happen at the tablet user interface with no adaptation of the television user interface at all.

Thus the configuration of the user-interface is determined by a knowledge of the user's context both in determining what adaptations to make and to which devices.

Context may be used to determine what to do next, but also how to present it in a way that is sensitive to the user's predicament. In other words, the user interface is contextual.

In an example where a user is watching video content on a tablet device whilst commuting home on public transport, during the commute the user interface of the device may allow the user to interact with the displayed content in a usual fashion—which is tailored by the state of the software. However when it is determined that the user is within a particular distance of the stop which they need to depart, with this information being detected by a location sensor, the users state changes and consequently the user interface is provided to display the content with an additional option to, for example, pause the content. The user interface is thus adapted to provide tailored or customised information in dependence on the context of being in a particular location.

In another example, if a user is watching content on a television, and is also using interactive glasses, then the user interface of the interactive glasses may be used to display information about the content to the user as described herein. If additional users move into the proximity of the television, such that they are also watching the television, and their location is detected because of personal devices that they have, then information about the content may be displayed on a user interface of the television rather than the original user's interactive glasses. The display of information on the user interface is therefore adapted according to the context of their being multiple users watching the displayed content. This context can be detected based on identifying the location of the personal devices of users. This context can be detected be determining that the personal devices of a plurality of users all communicate using short range communications technology, such as Bluetooth, with the device associated with the display. In general the context here determines the configuration of the user interface associated with the displayed content.

In all examples the user interface may be configured in accordance with context. Thus when a user interface is provided for a first device to control a second device associated with content, that user interface may be configured in accordance with context.

For example, if a using is wearing interactive glasses whilst watching content displayed by a second device, the display of the user interface may display the user's work emails until a certain time, and then after that time not display work emails. The display of the mails on the user interface is therefore context sensitive, the context being the time-of-day.

The various examples disclosed herein may be combined or implemented separately.

Each of the feature suggestions described herein give the user a more intimate relationship with the content ecosystem around them.

The invention claimed is:

1. A system comprising:
   a first device associated with a user and having a user interface for presenting a set of controls;
   a second device associated with the user and having a display for displaying content to the user; and
   a server connected to the first device and to the second device, wherein the first and second devices are configured to operate at least in part under control of the server, and,
   wherein the user interface of the first device is configured to be associated with content on the display of the second device, and the set of controls presented in the user interface of the first device is different in dependence on:
   (i) a state of content displayed on the second device, wherein:
      in a first state of the content displayed on the second device, with the first device being configured to be associated with the content on the display of the second device, a first user interface arrangement with first controls is presented at the user interface of the first device; and
      in a second, different state of the content displayed on the second device, with the first device being configured to be associated with the content on the display of the second device, a second user interface arrangement with second, different controls is presented at the user interface of the first device, and
   (ii) a context of the user associated with the first device, where the context represents a state of the user, wherein the set of controls presented in the user interface is different in dependence on the context of the user for a given content on the display of the second device,
   wherein:
      in a first user context of the user, with the first device configured to be associated with the content on the display of the second device, a user interface arrangement with the first controls or the second controls is presented at the user interface of the first device, and
      in a second, different, user context of the user, with the first device configured to be associated with the same content on the display of the second device, a third, different, user interface arrangement with third, different, controls is presented at the user interface of the first device.

2. The system according to claim 1 in which the user interface of the first device is configured by the server to a mode of operation to obtain ratings information of the displayed content, indicating the user's ratings of the displayed content.

3. The system according to claim 1 in which the user interface of the first device is configured by the server to a mode of operation to provide a remote control to control the displayed content.

4. The system according to claim 1 in which the user interface of the first device is configured by the server in dependence on sensed information.

5. The system according to claim 1 in which the user interface of the first device is configured by the server in dependence on relative positions of the first device and the second device.

6. The system according to claim 5 in which the user interface of the first device is further configured by the server in dependence on relative locations of the first and second devices.

7. The system according to claim 6 in which the user interface of the first device is further configured by the server based on a specific location of the first device.

8. The system according to claim 5 in which the user interface of the first device is configured by the server dependent on a relative orientation of the first and second devices.

9. The system according to claim 3 in which the remote control is provided by the user interface of the first device in conjunction with a user interface of a third device.

10. The system according to claim 9 in which information is displayed on one of the first, second, and third devices, and inputs are provided at another of the first, second, and third devices, to enable control of the displayed content.

11. The system according to claim 1 in which the content associated with the second device is not displayed.

12. The system according to claim 11 in which the user interface of the first device is additionally configured by the user in dependence on a user interface of a third device.

13. The system according to claim 1 in which the first device is a watch-type device.

14. The system according to claim 1 in which the first device is interactive glasses.

15. The system according to claim 1 in which the first device is used in combination with a third device having a user interface, one of the user interfaces of the first and third devices being used for a display, and one of the user interfaces of the first and third devices being used for an input.

16. The system according to claim 1 in which the user interface of the first device is further configured by the server by customising it in dependence on user preferences.

17. The system according to claim 1 wherein the user interface of the first device is further configured in dependence on a current and predicted context of the user associated with the first device.

18. The system according to claim 1 wherein the user interface of the first device is configured in dependence on a type of the first device.

19. The system according to claim 1 wherein the context is a descriptor which the first device measures or infers from one or more sensors or data stores to further configure the user interface of the first device.

20. A method of controlling a system comprising a first device having a user interface for presenting a set of controls and a second device having a display for displaying content, each of the devices being associated with a user, and a server connected to the first device and to the second device, wherein the first and second devices are configured to operate at least in part under control of the server, the method comprising:
  associating the user interface of the first device with the content displayed on the display of the second device;
  customizing the user interface of the first device in dependence on:
  (i) a state of content displayed on the second device, wherein:
    in a first state of the content displayed on the second device, with the first device configured to be associated with the content on the display of the second device, a first user interface arrangement with first controls is presented at the user interface of the first device; and
    in a second, different state of the content displayed on the second device, with the first device configured to be associated with the content on the display of the second device, a second user interface arrangement with second, different controls is presented at the user interface of the first device, and
  (ii) a context of the user associated with the first device, wherein the context represents a state of the user, wherein the set of controls presented in the user interface is different in dependence on the context of the user for a given content on the display of the second device, wherein:
    in a first user context of the user, with the first device being configured to be associated with content on the display of the second device, a user interface arrangement with the first controls or the second controls is presented at the user interface of the first device, and
    in a second, different, user context of the user, with the first device being configured to be associated with the same content on the display of the second device, a third, different, user interface arrangement with third, different, controls is presented at the user interface of the first device.

* * * * *